United States Patent
Webster et al.

(10) Patent No.: US 7,976,338 B1
(45) Date of Patent: Jul. 12, 2011

(54) JUNCTION BOX DEVICE

(76) Inventors: Marshall E. Webster, Durant, OK (US);
Louise V. Webster, Durant, OK (US)

( * ) Notice: Subject to any disclaimer, the term of this patent is extended or adjusted under 35 U.S.C. 154(b) by 4 days.

(21) Appl. No.: 12/691,380

(22) Filed: Jan. 21, 2010

(51) Int. Cl.
*H01R 13/60* (2006.01)

(52) U.S. Cl. .................................. 439/537; 362/404

(58) Field of Classification Search ............. 439/535, 439/537, 538, 539, 576, 142; 362/147, 404–406
See application file for complete search history.

(56) References Cited

U.S. PATENT DOCUMENTS

| | | | |
|---|---|---|---|
| 3,302,918 A * | 2/1967 | Cohen | 248/343 |
| 4,513,994 A | 4/1985 | Dover et al. | |
| D306,254 S | 2/1990 | Kerr, Jr. | |
| 4,929,187 A | 5/1990 | Hudson et al. | |
| 6,146,191 A | 11/2000 | Kerr, Jr. et al. | |
| 6,291,768 B1 | 9/2001 | Reiker | |
| 6,423,897 B1 * | 7/2002 | Roesch et al. | 174/50 |
| 6,530,806 B2 * | 3/2003 | Nelson | 439/528 |
| 6,780,049 B1 | 8/2004 | D'Angelo et al. | |
| 6,827,229 B2 | 12/2004 | Dinh et al. | |
| 7,064,269 B2 | 6/2006 | Smith | |
| 7,118,413 B2 * | 10/2006 | Kidman | 439/538 |
| 7,198,514 B1 * | 4/2007 | Grimes | 439/538 |
| 7,243,891 B2 * | 7/2007 | Wu et al. | 248/342 |
| 7,278,878 B2 * | 10/2007 | Draggie et al. | 439/535 |
| 7,306,482 B1 * | 12/2007 | Kidman | 439/538 |
| 7,425,150 B1 * | 9/2008 | Roe et al. | 439/538 |
| 7,575,470 B2 * | 8/2009 | Pyrros | 439/535 |
| 7,576,284 B2 * | 8/2009 | Dinh | 174/50 |
| 2006/0289192 A1 | 12/2006 | Johnson et al. | |

* cited by examiner

*Primary Examiner* — Neil Abrams
*Assistant Examiner* — Phuong T Nguyen

(57) ABSTRACT

A junction box device comprising a junction box mountable on a wall or a ceiling; a duplex receptacle attached in the inner cavity of the junction box, the duplex receptacle comprises a first outlet and a second outlet, the first outlet and the second outlet can engage a first plug of a light fixture or a second plug of a ceiling fan, respectively, wherein the duplex receptacle is operatively connected to a power source; and a first adapter plate attachable to the junction box, the first adapter plate functions to secure a threaded tube support component that extends from the junction box and can secure the light fixture, wherein the threaded tube support component can be threaded through a tube aperture disposed in the first adapter plate.

13 Claims, 5 Drawing Sheets

JUNCTION BOX DEVICE

FIELD OF THE INVENTION

The present invention is directed to fixtures and supports for electrical devices, more particularly to a device that can be installed in a ceiling or wall for supporting a ceiling fan and/or a light fixture.

BACKGROUND OF THE INVENTION

In some homes or buildings, for example in older homes, ceiling fans or light fixtures are not installed in ceilings. The present invention features a junction box device for installing in a ceiling or wall. The junction box device allows a ceiling fan or light fixture to be installed into an existing ceiling junction box or new junction box (e.g., easy installation with plug in/plug out).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
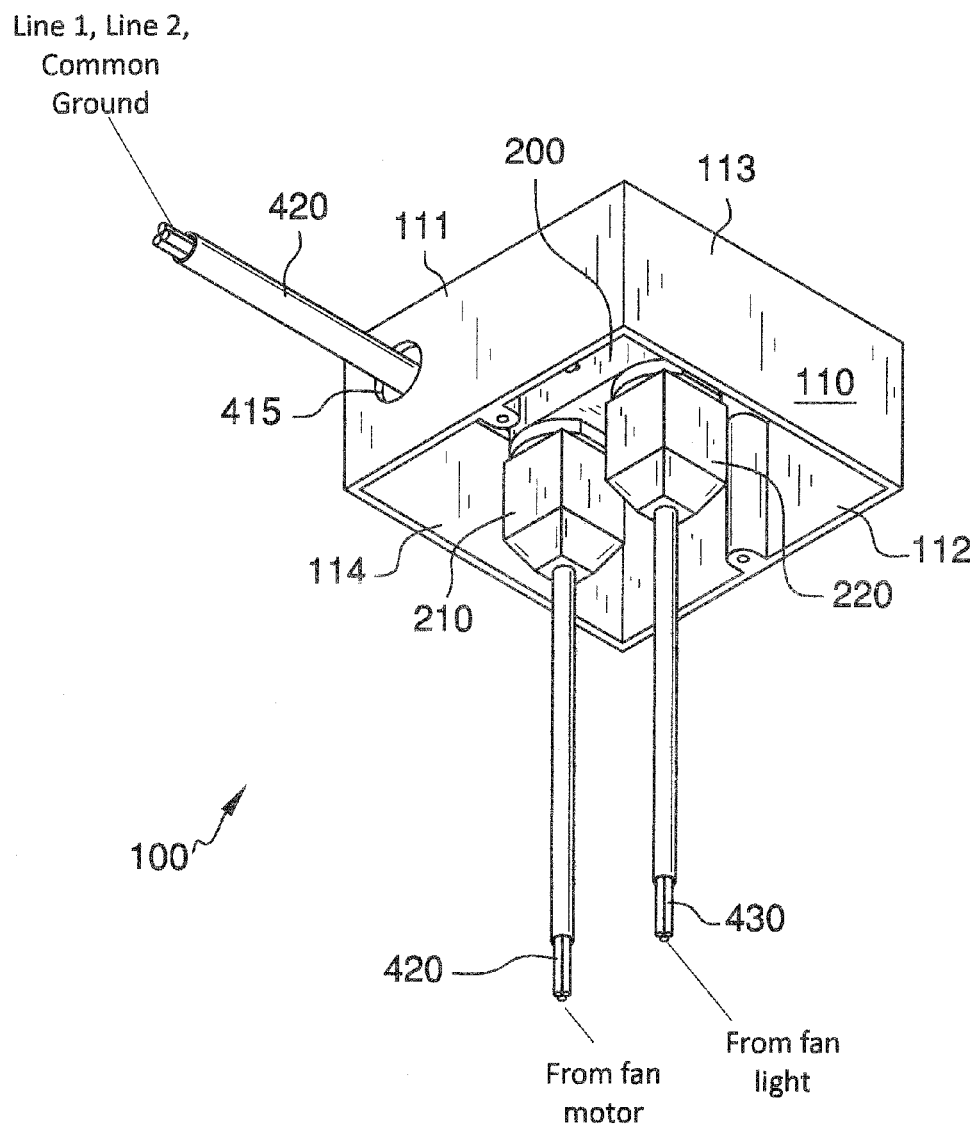
FIG. 1 is a perspective view of an embodiment of the junction box device of the present invention, wherein a light fixture and a fan can be connected to the junction box device.

Referring now to FIGS. 1-5, the present invention features a junction box device 100 for installing in a ceiling or wall. The junction box device allows a ceiling fan or light fixture to be easily secured to the ceiling or wall.

The junction box device 100 of the present invention comprises a junction box 110 for mounting on the wall or ceiling. In some embodiments, the junction box 110 is generally rectangular having a top panel, a first side panel 111, a second side panel 112, a third side panel 113, a fourth side panel 114, an open bottom, and an inner cavity. The top panel of the junction box 110 can be attached to the ceiling or wall via an attachment means (e.g., nails, screws, bolts, adhesives, clasps, etc.).

Disposed in the inner cavity of the junction box 110 (and attached to the top panel) is a duplex receptacle 200 (e.g., split duplex receptacle) having a first outlet 201 and a second outlet 202. The duplex receptacle 200 allows electrical plugs of devices (e.g., light fixture, fan) to be engaged. In some embodiments, a first plug 210 of a light fixture can be plugged into the first outlet 201 and a second plug 220 of a fan can be plugged into the second outlet 202. In some embodiments, the junction box device 100 comprises the first plug 210 and the second plug 220, wherein the wiring 420 of the first plug 210 can be connected to the power leads of the light fixture and the wiring 430 of the second plug 220 can be connected to the power leads of the fan.

The duplex receptacle 200 is operatively connected to a power source (e.g., main powers supply). In some embodiments, a power cord 410 operatively connects the duplex receptacle 200 to the power source (e.g., main power supply). In some embodiments, the power cord 410 is fed through a power cord aperture 415 disposed in the junction box 110.

Figure 2:
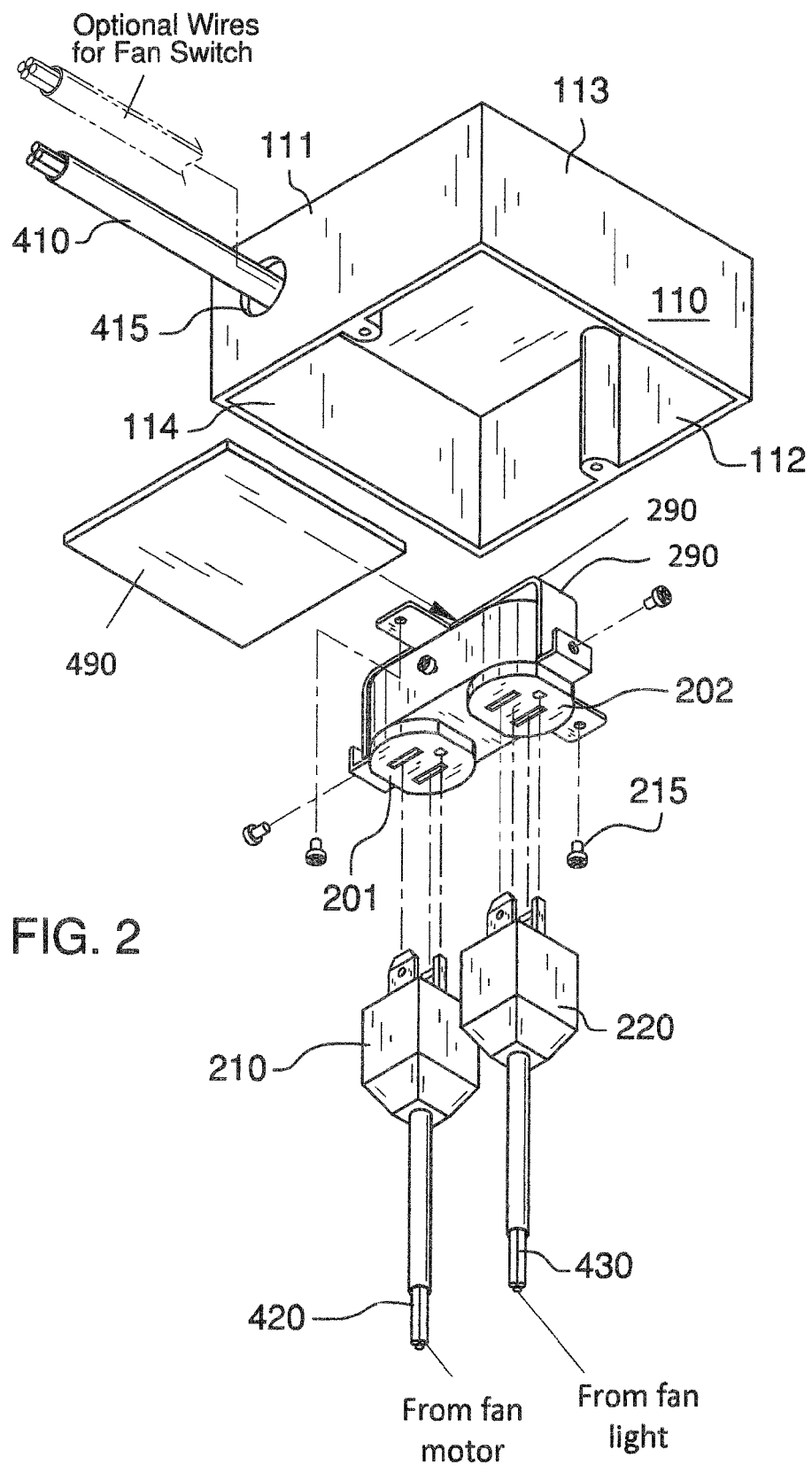
FIG. 2 is an exploded view of the junction box device of FIG. 1.

The duplex receptacle 200, as shown in FIG. 2, may be an outlet with isolated power terminals. The duplex receptacle 200, as shown in FIG. 4, may be an outlet with non-isolated power terminals.

As shown in FIG. 2, the duplex receptacle 200 may be attached (e.g., removably) in the inner cavity of the junction box 110 (to the top panel) via an attachment means. In some embodiments, the attachment means is a mounting bracket 290. Mounting brackets for receptacles are well known to one of ordinary skill in the art. The mounting bracket 290 may be attached to the receptacle 200, for example via screws, or the mounting bracket 290 may be more rigidly attached to the receptacle, for example via an adhesive (or the mounting bracket 290 is incorporated into the receptacle 200). In some embodiments, the duplex receptacle may be fixedly attached in the inner cavity of the junction box 110 (to the top panel). In some embodiments, one or more screws 215 may be driven through screw apertures disposed on the duplex receptacle 200 (e.g., disposed on a wing on the duplex receptacle 200) or screw apertures disposed on the mounting bracket 290, and further through the top panel of the junction box 110.

Figure 4:
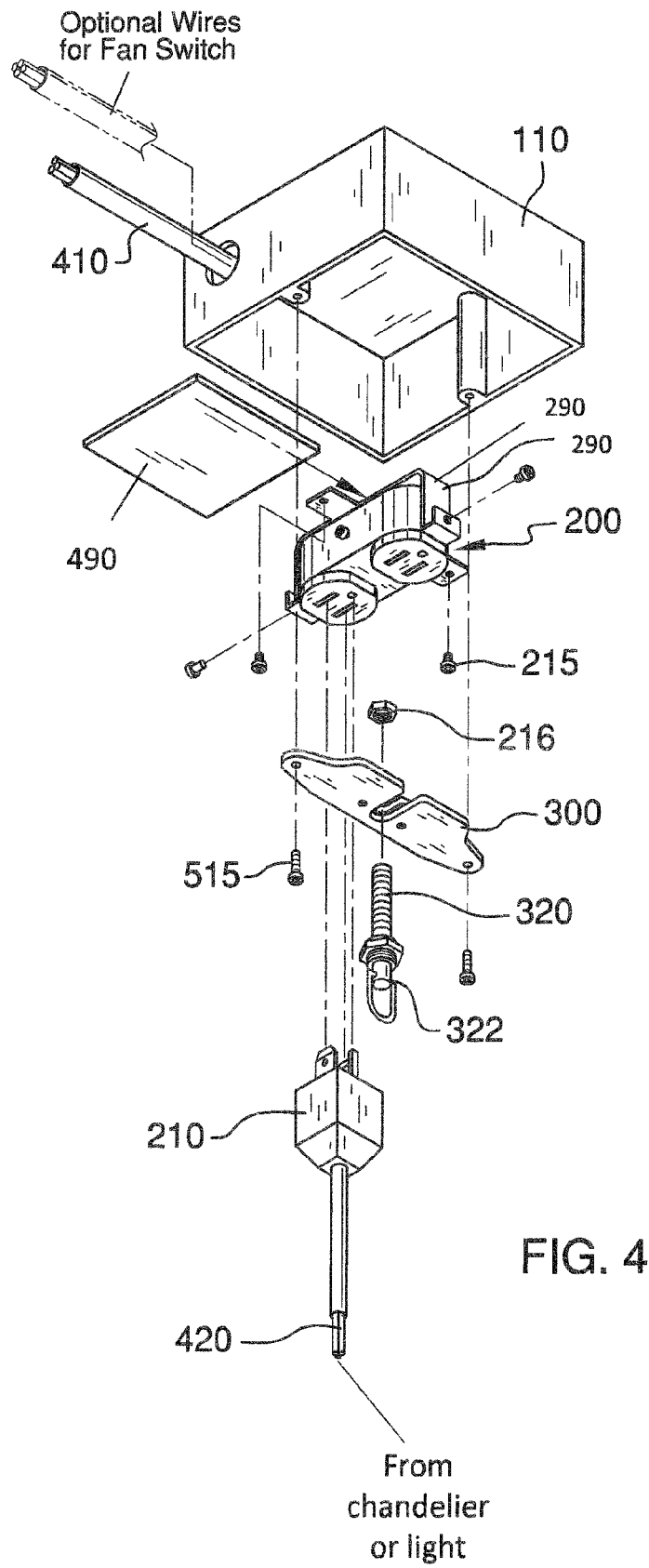
FIG. 4 is an exploded view of the junction box device of FIG. 3.

As shown in FIG. 2 and FIG. 4, in some embodiments, the junction box device 100 comprises an Insulation barrier 490. The barrier 490 may be used for existing steel box installation. FIG. 2 also shows a power cord 410 which can operatively connect the duplex receptacle 200 to a power source or to another object. In some embodiments, the cord 410 is used for fan switch operation. In some embodiments, the cord 410 is used for wall switch installation.

Figure 3:
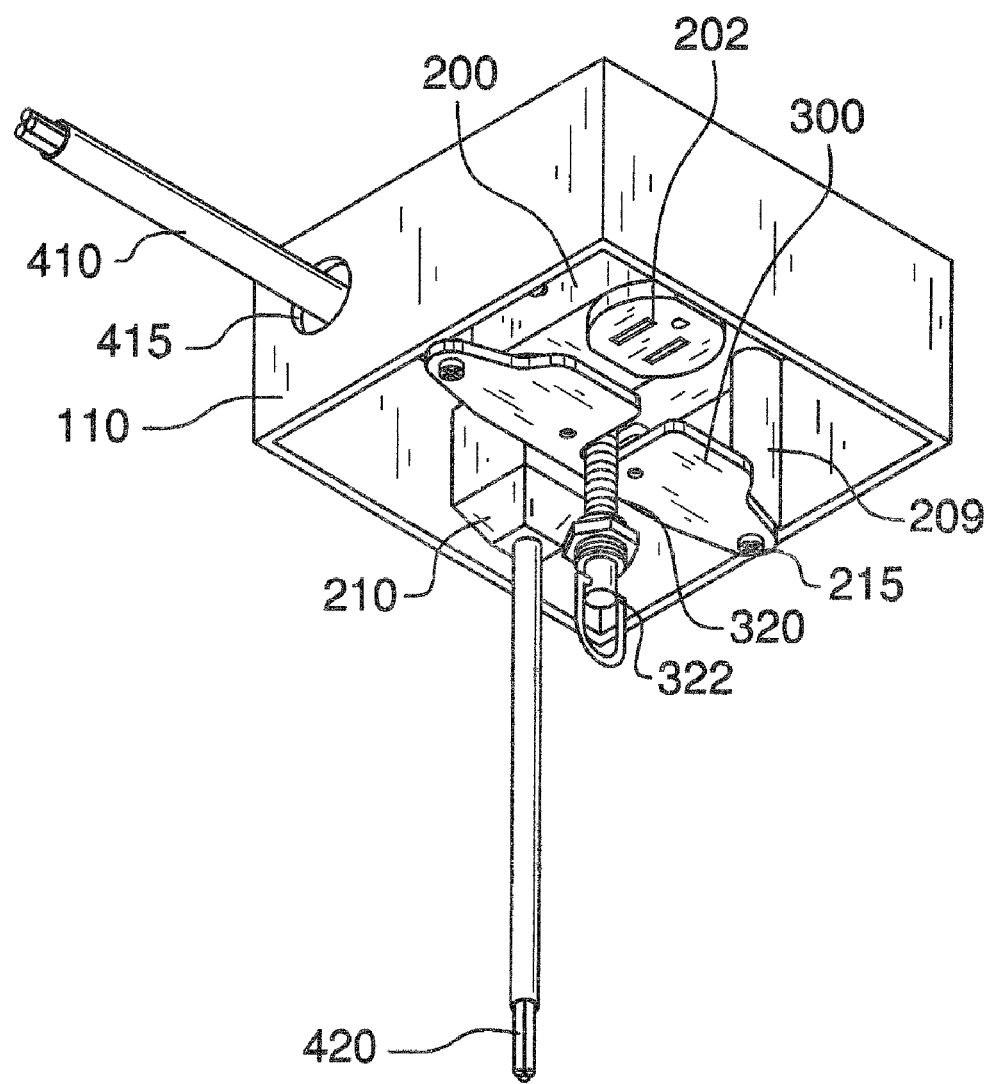
FIG. 3 is a perspective view of a junction box device of the present invention, wherein a light fixture can be connected to the junction box device.

As shown in FIG. 3, in some embodiments, the second plug 202 is not used for a ceiling fan. A first plug 210 of a light fixture is engaged in the first plug 201. The device 100 may further comprise a first adapter plate 300 for securing the duplex receptacle 200 in place (e.g., secured in the inner cavity of the junction box 110 to the top panel). The first adapter plate 300 may be attached to the duplex receptacle 200 and/or to the junction box 110. As shown in FIG. 4, screws 515 can be driven through screw apertures in the first adapter plate 300 and further into screw braces 209 disposed in the junction box 110 (e.g., in the inner cavity of the junction box 110).

Figure 5:
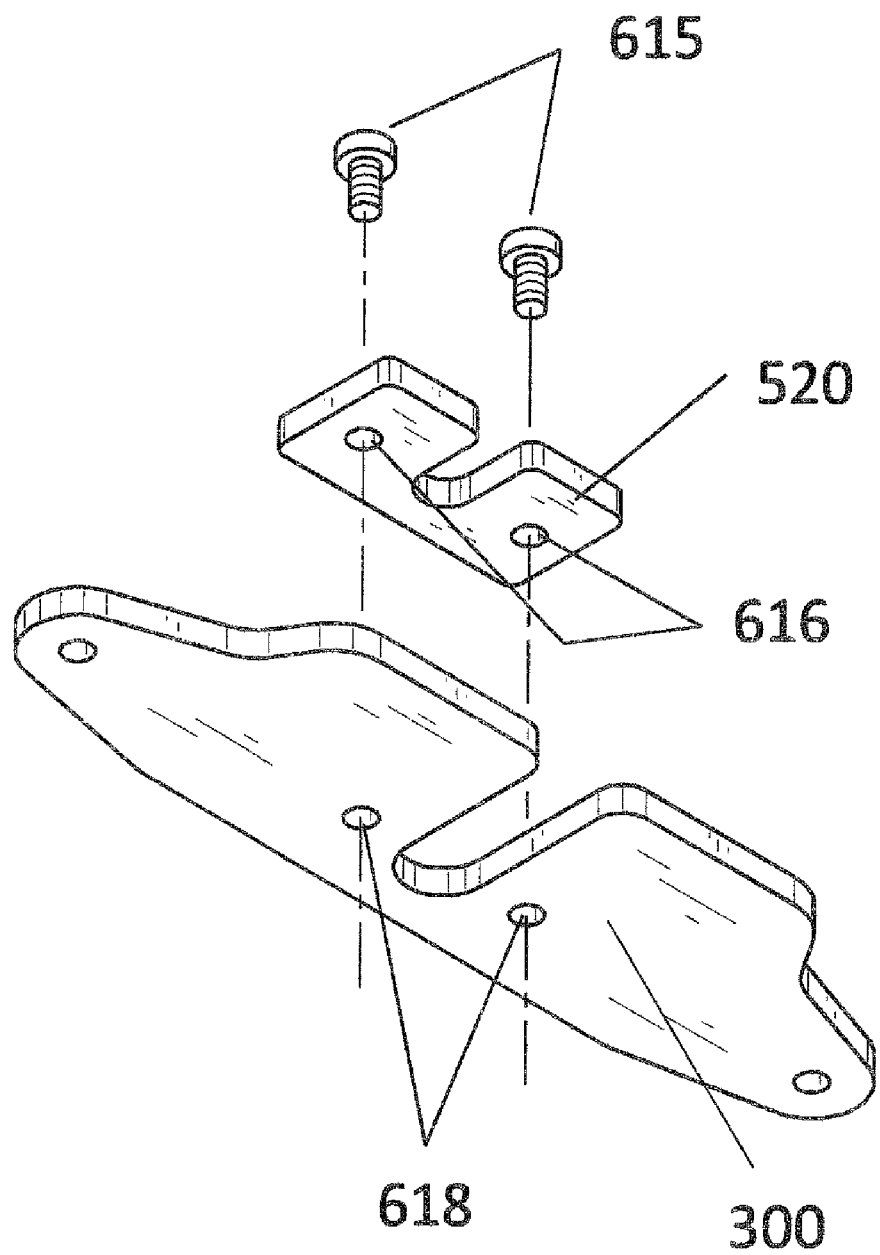
FIG. 5 is an exploded view of components of the device of FIG. 3.

The first adapter plate 300 may also function to secure a threaded tube support component 320. The threaded tube support component 320 allows a light fixture to be secured to the junction box device 100. The threaded tube support component 320 may be threaded through a tube aperture disposed in the first adapter plate 300. The threaded tube support component 320 may be inserted through the tube aperture a certain distance, and may be further blocked by the presence of the duplex receptacle 200 (e.g., because the duplex receptacle 200 is positioned behind the first adapter plate 300). The threaded tube support component 320 may be secured in the tube aperture via a nut 216. The tube aperture, as shown in FIG. 4 and FIG. 5, may be a slit in the first adapter plate 300. The slit allows the threaded tube support component 320 to be inserted into the tube aperture from the side (which may be easier than threading from the bottom).

The threaded tube support component 320 may have a connector piece 322 disposed on a first end (the second end of the threaded tube support component 320 facing the duplex receptacle 200). The connector piece 322 may function to attach the light fixture.

As shown in FIG. 5, in some embodiments, the device 100 further comprises a second adapter plate 520 for securing the threaded tube support component 320. In some embodiments, the second adapter plate 520 is sandwiched between the first adapter plate 300 and the duplex receptacle 200. The second adapter plate 520 may be attached to the first adapter plate 300 via an attachment means, for example screws 615 may be driven through screw apertures 616 in the second adapter plate 520 and further through screw apertures 618 disposed in the first adapter plate 300. The second adapter plate 520 may provide more support and stability to the threaded tube support component 320.

The junction box device 100 of the present invention may be constructed from a variety of materials. For example, in some embodiments, the junction box device 100 is constructed from a material comprising a metal, a plastic, the like, or a combination thereof.

The following the disclosures of the following U.S. patents are incorporated in their entirety by reference herein: U.S. Pat. No. 4,513,994; U.S. Pat. No. 4,929,187; U.S. Pat. No. 7,064,269; U.S. Pat. No. 6,780,049; U.S. Pat. No. 6,291,768; U.S. Pat. Application No. 2006/0289192.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A junction box device comprising:
   (a) a junction box having a top panel, an inner cavity, and an open bottom, the top panel of the junction box is mountable on a wall or a ceiling;
   (b) a duplex receptacle attached via an attachment means for receiving in the inner cavity of the junction box, the duplex receptacle comprises a first outlet and a second outlet, the first outlet and the second outlet can engage a first plug of a light fixture or a second plug of a ceiling fan, respectively, wherein the duplex receptacle is operatively connected to a power source; and
   (c) a first adapter plate attachable to the junction box, the first adapter plate functions to secure a threaded tube support component that extends from the junction box and can secure the light fixture, wherein the threaded tube support component can be threaded through a tube aperture disposed in the first adapter plate;
   d) a second adapter plate for further securing the threaded tube support component, the second adapter plate can be sandwiched between the first adapter plate and the duplex receptacle;
   e) the second adapter plate can be attached to the first adapter plate via screws, the screws can be driven through screw apertures disposed in the second adapter plate and further through screw apertures disposed in the first adapter plate.

2. The junction box device of claim 1, wherein the top panel of the junction box can be attached to the ceiling or the wall via nails, screws, bolts, adhesives, or clasps.

3. The junction box device of claim 1, wherein the duplex receptacle is removably attached in the inner cavity of the junction box.

4. The junction box device of claim 1, wherein the junction box device comprises the first plug and wiring, wherein the wiring can be connected to power leads of a light fixture.

5. The junction box device of claim 1, wherein the junction box device comprises the second plug and wiring, wherein the wiring can be connected to power leads of a ceiling fan.

6. The junction box device of claim 1, wherein the first adapter plate is attachable to the junction box via screws, the screws can be driven through screw apertures disposed in the first adapter plate and further through screw braces disposed in the junction box.

7. The junction box device of claim 1, wherein the threaded tube support component may be secured in the tube aperture via a nut.

8. The junction box device of claim 1, wherein the threaded tube support component comprises a connector piece disposed on a first end, the connector piece functions to attach a light fixture.

9. The junction box device of claim 1, wherein the tube aperture is a slit in the first adapter plate allowing the threaded tube support component to be inserted into the tube aperture sideways.

10. The junction box device of claim 1, wherein the attachment means is a mounting bracket.

11. The junction box device of claim 1 further comprising an insulation barrier.

12. The junction box device of claim 1, wherein the duplex receptacle is operatively connected to a power source via a power cord.

13. The junction box device of claim 12, wherein the power cord is fed through a power cord aperture disposed in the junction box.

\* \* \* \* \*